United States Patent [19]

Gotomyo

[11] 4,148,516
[45] Apr. 10, 1979

[54] MEANS FOR AUTOMATICALLY OPENING REAR STORAGE COMPARTMENT COVER OF AN AUTOMOBILE

[75] Inventor: Yasuo Gotomyo, Hiroshima, Japan

[73] Assignee: Toyo Kogyo Co., Ltd., Hiroshima, Japan

[21] Appl. No.: 834,547

[22] Filed: Sep. 19, 1977

[30] Foreign Application Priority Data

Sep. 20, 1976 [JP] Japan .............................. 51-127222[U]

[51] Int. Cl.² .............................................. B60R 5/04
[52] U.S. Cl. .................................................. 296/37.1
[58] Field of Search ..................... 296/24 R, 76, 37.1, 296/100, 37.8, 37.14, 37.15, 37.16; 150/52 E, 52 F

[56] References Cited

U.S. PATENT DOCUMENTS

| | | | |
|---|---|---|---|
| 3,909,060 | 9/1975 | Katayama | 296/37 R |
| 3,910,625 | 10/1975 | Menard | 296/37 R |

*Primary Examiner*—Richard A. Bertsch
*Attorney, Agent, or Firm*—Fleit & Jacobson

[57] ABSTRACT

Automobile having a tailgate and a rear storage compartment associated with a cover. The cover is detachably hinged to the automobile body at the front edge and connected by a flexible strap with the tailgate so that it can be raised upon opening of the tailgate. The strap is passed through a ring which is provided on one end of a rubber strip, the other end of the rubber being secured at the bottom of the cover whereby the strap can be retracted beneath the cover whenever the strap is relieved of tension.

8 Claims, 6 Drawing Figures

MEANS FOR AUTOMATICALLY OPENING REAR STORAGE COMPARTMENT COVER OF AN AUTOMOBILE

The present invention relates to an automobile having a tail gate and a rear storage compartment associated with a cover. More particularly, the present invention relates to an arrangement for automatically raising the cover of the rear storage compartment upon opening of the tail gate.

In an automobile having a tail gate and a rear storage compartment provided between a rear seat and the tail gate, it has already been proposed to provide a compartment cover which can be automatically raised to open the compartment upon opening of the tail gate. For example, the U.S. Pat. No. 3,909,060 discloses an arrangement wherein a pair of elastic cords are secured at one of their ends with the outer edge of the tailgate and at the other ends to the body of the automobile in such a manner that the compartment cover is supported in open position by the elastic cords when the tailgate is opened. When the tailgate is closed, the tension forces in the elastic cords are released so that the compartment cover is allowed to descend to assume the closed position.

In this arrangement, since the elastic cords are brought into sliding contact with the compartment cover, it has been difficult to obtain a smooth operation of the cover. Further, there is a high possibility that the elastic cords are damaged through the sliding contact with the compartment cover. The arrangement is also disadvantageous in that the elastic cords are subjected to the weight of the compartment cover as well as the weight of packages on the cover if any whenever the tailgate is opened. Therefore, the elastic cords are often deteriorated and lose their elasticity through a prolonged period of use.

The U.S. Pat. No. 3,181,911 discloses an arrangement wherein the compartment cover is connected with the tailgate through a linkage so that the cover is automatically actuated upon operation of the tailgate. However, the arrangement is disadvantageous from the viewpoint of appearance because the linkage is exposed to the room even when the compartment cover is closed. Further, the provision of such linkage may unnecessarily limit the available space particularly when the compartment cover is removed for loading bulky packages.

The U.S. Patent No. 3,910,625 discloses an arrangement wherein the tailgate has a retractor for taking up a belt which is connected with the compartment cover. This arrangement may be subjected to a trouble in operation in that the belt may not be smoothly taken up by the retractor. For example, even a slight misalignment of the retractor with respect to the belt may cause a failure of taking up the belt.

The present invention has therefore an object to provide a mechanism for automatically actuating the compartment cover upon operation of the tailgate without accompanying any disadvantage as experienced in the conventional arrangements.

Another object of the present invention is to provide a simple and reliable mechanism for automatically and smoothly actuating the storage compartment cover upon operation of the tailgate.

A further object of the present invention is to provide a mechanism for actuating the storage compartment cover in response to an operation of the tailgate, said mechanism having a low friction connecting member which can further be retracted smoothly when the cover is closed.

Still further object of the present invention is to provide a mechanism for actuating the storage compartment cover in response to an actuation of the tailgate, said mechanism including flexible connecting means between the cover and the tailgate and elastically extensible means for retracting the connecting means, the arrangement being such that the elastically extensible means being free of any load from the cover.

A further object of the present invention is to provide a rear storage compartment cover which can be actuated in response to an operation of the tailgate and can be readily removed as desired.

According to the present invention, the above and other objects can be accomplished by an automobile comprising a body having a rear opening, tailgate means mounted on said body for movement between a closed position wherein the tailgate means closes the rear opening and an open position wherein the rear opening is opened, seat means provided in said body, rear storage compartment defined in said body between said seat means and said tailgate means, rear compartment cover means adapted to cover said rear storage compartment and having a hinged front end, cover actuating means including at least one flexible connecting member having one end connected to the cover means and the other end to the tailgate means so that the cover means is raised through said flexible member upon opening of said tailgate means, and yieldable retracting means for retracting said connecting member beneath the cover means whenever said connecting member is relieved of tension. Preferably, the retracting means comprises a spring or an extensible elastic member having one end secured to the cover means and the other end provided with a ring through which said connecting member is passed. The cover means may be provided at the lower surface with a case in which said retracting means is positioned. In such an arrangement, the connecting member is retracted into the case.

The connecting member may preferably be connected detachably with the tailgate means. Further, the cover means may be detachably hinged at the front end so that it can be removed as desired. The cover means may also be provided with detachable hinge means so that it can be opened by a person in the seat means.

The above and other objects and features of the present invention will become apparent from the following descriptions of preferred embodiments taking reference to the accompanying drawings, in which.

Figure 1:
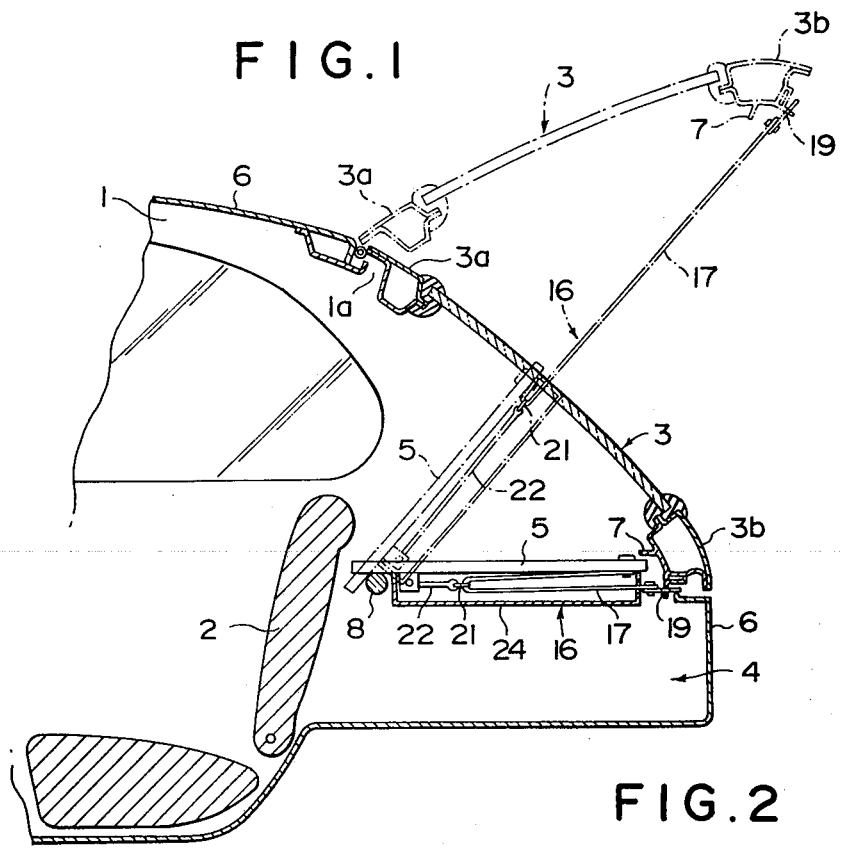
FIG. 1 is a fragmentary sectional view showing the rear portion of an automobile embodying the feature of the present invention.

Referring now to the drawings, particularly to FIG. 1, the automobile shown therein includes a body 1 having a rear opening 1a. In the body 1, there is disposed a rear seat 2, and a tailgate 3 is mounted to close the rear opening 1a. The tailgate 3 comprises a frame which includes an upper and a lower frame elements 3a and 3b, respectively, and is hinged at the upper frame element 3a to the upper edge of the opening 1a.

Figure 2:
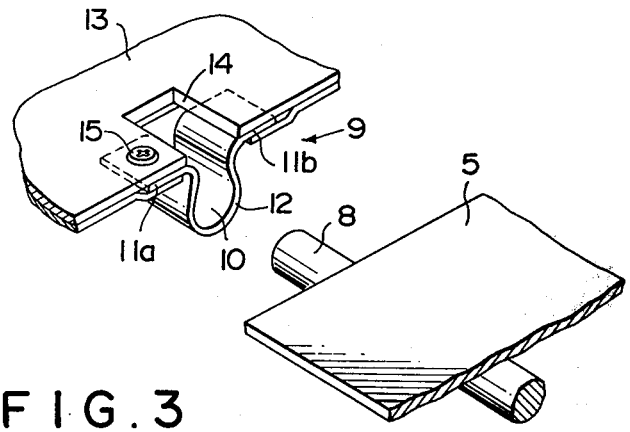
FIG. 2 is a perspective view showing the detachable hinge which is employed in the embodiment shown in FIG. 1.

Between the rear seat 2 and the tailgate 3, there is defined a rear storage compartment 4 and a compartment cover 5 is provided at the upper portion of the storage compartment. As shown in FIG. 2, the cover 5 is provided at its front end portion with a pair of transversely projecting hinge pins 8. The body is provided at the front end portion of the storage compartment 4 with support plates 13 which have hinge receptacles 9 for co-operation with the hinge pins 8. Referring further to FIG. 2 which shows only one of the hinge pins 8 and one of the hinge receptacles 9, the support plate 13 has a rectangular cutout 14 through which the hinge pin 8 can be freely passed. The hinge receptacle 9 comprises a resilient element 12 which includes an open-topped U-shaped portion 10 and a pair of flanges 11a and 11b. The element 12 is located with the open top of the U-shaped portion 10 in alignment with the cutout 14 in the support plate 13 and secured at the flange 11a to the plate 13 by means of a screw 15. The flange 11b of the element 12 is slidable along the lower surface of the plate 13. The U-shaped portion 10 is of such a configuration that the top opening is slightly narrower than the widest intermediate portion so that, when the hinge pin 8 is inserted into the U-shaped portion 10 of the element 12, the top opening of the U-shaped portion 10 is expanded to allow the pin 8 to pass into the portion 10. Thus, the cover 5 is detachably hinged to the support plate 13.

Figure 3:
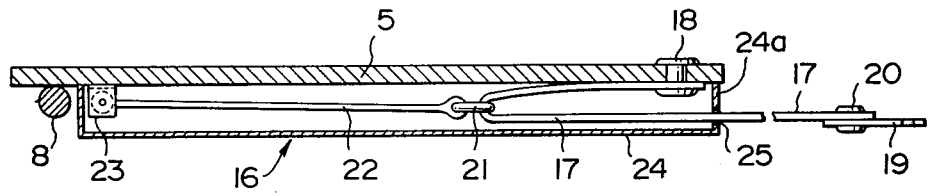
FIG. 3 is an enlarged vertical sectional view showing the detail of the mechanism employed in the embodiment shown in FIG. 1.
Figure 4:
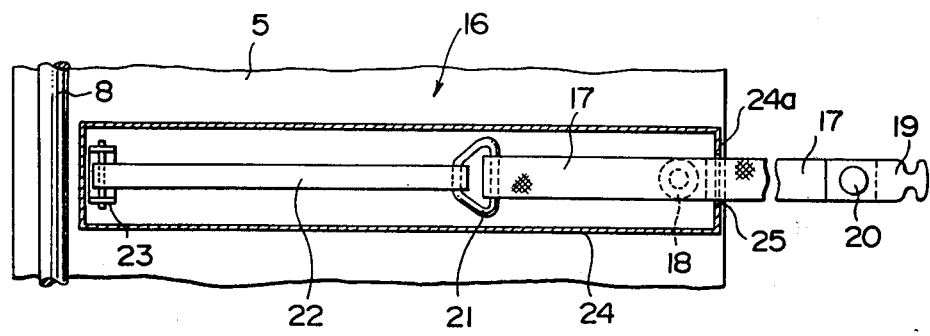
FIG. 4 is a horizontal sectional view of the mechanism shown in FIG. 3.

The compartment cover 5 is provided with an interconnecting mechanism 16 at the lower surface thereof. Referring to FIGS. 3 and 4, the mechanism 16 comprises a flexible connecting member such as strap 17. Alternatively, a string, cord, wire or the like may be used instead of the strap 17. The strap 17 is secured at one end to the rear lower surface of the cover 5 by means of a fastener 18 and has a detachable connecting element 19 which is secured thereto at the other end by means of a fastener 20. A co-operating element is provided on the lower frame element 3b of the tailgate 3 for engagement with the element 19 so that the element 19 can be detachably connected to the tailgate 3.

The mechanism 16 further comprises a retracting member such as a rubber strip 22 secured at one end to the lower surface of the cover 5 by means of a fitting 23. In the place of the rubber strip 22, a coil spring or the like may also be used. The retracting member 22 has a ring 21 at the other end and the strap 17 is passed through the ring 21. The mechanism 16 is also includes a case 24 which secured to the lower surface of the cover 5 so as to encircle the retracting member 22 and the end of the strap 17 which is secured to the cover 5. The case 24 is formed at its end 24a with a slit 25 which is of a size that allows free passage of the strap 17 but prevents passage of the connecting element 19.

Thus, when the connecting element 19 is disengaged from the co-operating element on the tailgate 3, the strap 17 is completely retracted into the case 24 under the action of the member 22 with only the connecting element 19 left outside the casing 24. In this position, the cover 5 may be removed from the body 1 whenever desired.

When the tailgate 3 is opened from the position shown by the solid lines to the position shown by broken lines in FIG. 1 with the connecting element 19 at the end of the connecting strap 17 engaged with the co-operating element on the tailgate 3, the strap 17 is drawn out of the case 24 until it is fully stretched between the tailgate and the cover 5 causing an elongation of the retracting member 22.

Further upward movement of the tailgate 3 causes an upward pivotal movement of the cover 5 about the hinge pins 8 since the raising force is transmitted from the tailgate 3 to the cover 5 through the strap 17. Thus, the cover 5 is opened as shown by broken lines in FIG. 1 to allow easy access to the storage compartment 4.

When the tailgate 3 is closed, the cover 5 is lowered to the closed position shown by solid lines in FIG. 1 during the initial stage of downward movement of the tailgate 3. Through further downward movement of the tailgate 3, the strap 17 is relieved of tension so that it is retracted into the case 24 under the action of the member 22. In this position, it is possible to open the cover 5 from the front side simply by disengaging the hinge pins 8 from the receptacles 9.

Figure 6:
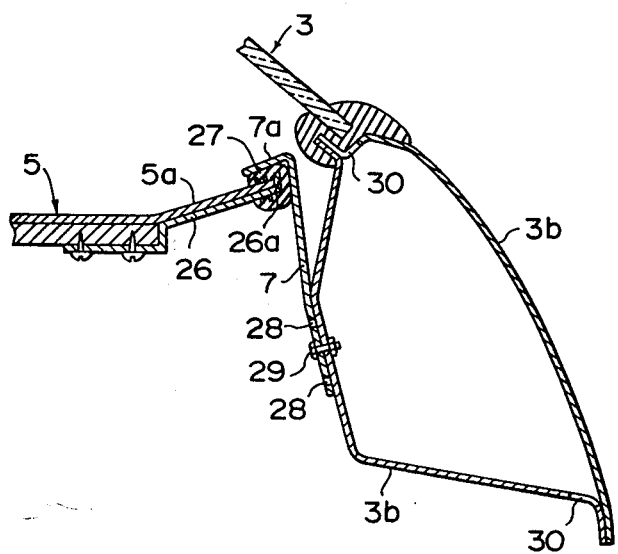
FIG. 6 is a fragmentary sectional view in an enlarged scale showing the detail of the cover stopping mechanism.

As shown in FIG. 6, the lower frame element 3b of the tailgate 3 may be provided with an arresting member 7 which is secured thereto by means of a bolt 29 and has a hooked upper end 7a. The cover 5 may then be formed with a rearward extension 5a stiffened by a reinforcing patch 26. The extension 5a has at the rear end a rubber cushion 27 which is adapted to engage the hooked end 7a of the arresting member 7. The rear end of the reinforcing patch 26 is bent upwardly as shown by 26a in FIG. 6 so as to hold the rubber cushion against falling off. With this arrangement, the cover 5 can be positively maintained in the closed position. Thus, any vibration of the cover 5 can be prevented. Further, the rear end of the cover 5 is firmly held when the cover 5 is opened at the front end as described before. The arresting member 7 may be provided with several bolt holes 28 for allowing adjustment of location thereof. Alternatively, an elongated slot may be formed for accommodating the bolt 29. The frame of the tailgate 3 may be formed with water drain holes as shown by 30 in FIG. 6.

It should be noted herein that, according to the arrangement as described, the retracting member 22 functions only to retract the strap or connecting member 17 when it is relieved of tension. Thus, the member 22 is elongated as soon as the tailgate 3 is lifted so as to allow the connecting member 17 to be stretched between the tailgate 3 and the cover 5. The retracting member 22 is therefore free from any load from the cover 5. It will thus be understood that the retracting member 22 may be of a weak elastic force so that the strap or connecting member 17 can be readily drawn out of the casing for installation to the tailgate. Since the retracting member 22 has a ring 21 through which the strap 17 is passed, the compartment cover 5 can be automatically and smoothly operated upon movement of the tailgate 3.

Figure 5:
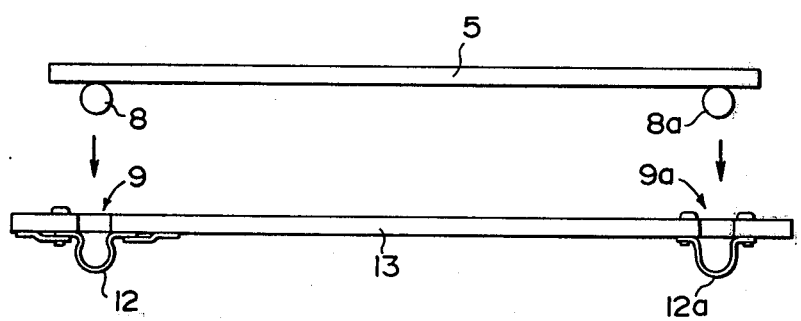
FIG. 5 is a diagrammatical view showing an embodiment in which detachable hinges are provided in front and rear ends of the compartment cover.

FIG. 5 shows another embodiment of the present invention in which the storage compartment cover 5 is provided at the rear end portion with hinge pins 8a as well as the hinge pins 8 which are located at the front end portion as in the previous embodiment. The support plate 13 is therefore provided with hinge receptacles 9a having receptacle elements 12a for receiving the hinge pins 8a in addition to the receptacles 9 having elements 12. This arrangement may sometimes be recommendable because it facilitates opening of the cover 5 at the front side.

The invention has thus been shown and described with reference to specific arrangements, however, it should be noted that the invention is in no way limited to the details of the illustrated structures but changes and modifications may be made within the scope of the appended claims. For example, it is of course within the scope of the present invention to provide telescoping brackets such as those shown in the U.S. Pat. No. 3,909,060 for assisting easy operation of the tailgate.

I claim:

1. Automobile comprising a body having a rear opening, tailgate means mounted on said body for movement between a closed position wherein the tailgate means closes the rear opening and an open position wherein the rear opening is opened, seat means provided in said body for supporting items within said body, rear storage compartment defined in said body between said seat means and said tailgate means, rear compartment cover means for covering said rear storage compartment and having a hinged front end, cover actuating means including at least one flexible connecting member having one end connected to the cover means and the other end to the tailgate means so that the cover means is raised through said flexible member upon opening of said tailgate means, and yieldable retracting means for retracting said connecting member and including at least one elastic member having one end secured to the cover means and the other end provided with slidable connecting means for slidably engaging said elastic member with said connecting member so that said connecting member is retracted beneath the cover means whenever said connecting member is relieved of tension.

2. Automobile in accordance with claim 1 in which said slidable connecting means is a ring-shaped member through which said connecting member is slidably passed.

3. Automobile in accordance with claim 2 in which said cover means is provided at its lower surface with case means for encircling the connecting member and said ring shaped member.

4. Automobile in accordance with claim 2 in which said elastic member is adequately weak so that it is elongated as soon as the tailgate means is lifted allowing the connecting member to be stretched between the cover means and the tailgate means.

5. Automobile in accordance with claim 1 in which said connecting member is removably connected at said other end with the tailgate means.

6. Automobile in accordance with claim 1 in which said cover means is detachably hinged at the front end.

7. Automobile in accordance with claim 6 in which said cover means is detachably hinged at rear end.

8. Automobile in accordance with claim 1 in which said tailgate means is provided with arresting means for engaging with the cover means at its rear end so that the cover means is firmly maintained at the closed position.

* * * * *